(12) United States Patent
Mock et al.

(10) Patent No.: US 9,103,846 B2
(45) Date of Patent: Aug. 11, 2015

(54) MEASURING DEVICE FOR DETERMINING AN OPERATING STATE VARIABLE OF A ROTATING STRUCTURAL ELEMENT, IN PARTICULAR A BEARING

(75) Inventors: Christian Mock, Schweinfurt (DE); Jens Heim, Bergrheinfeld (DE); Florian Koeniger, Schweinfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 680 days.

(21) Appl. No.: 13/367,496

(22) Filed: Feb. 7, 2012

(65) Prior Publication Data

US 2012/0200289 A1 Aug. 9, 2012

(30) Foreign Application Priority Data

Feb. 7, 2011 (DE) .......................... 10 2011 003 703

(51) Int. Cl.
*G01P 3/44* (2006.01)
*F16C 41/00* (2006.01)

(52) U.S. Cl.
CPC ............... *G01P 3/443* (2013.01); *F16C 41/004* (2013.01); *F16C 41/007* (2013.01); *F16C 41/008* (2013.01)

(58) Field of Classification Search
None
See application file for complete search history.

(56) References Cited

U.S. PATENT DOCUMENTS

| 3,916,234 A * | 10/1975 | Stigall et al. .................. 310/155 |
| 2003/0093188 A1* | 5/2003 | Morita et al. ..................... 701/1 |
| 2005/0150281 A1 | 7/2005 | Schroeder |
| 2009/0051349 A1* | 2/2009 | Fruehling et al. ............. 324/173 |

FOREIGN PATENT DOCUMENTS

| DE | 69822110 T2 | 1/2005 |
| EP | 1 342 633 A2 | 9/2003 |
| JP | 2003 120702 A | 4/2003 |
| WO | 2008153899 A2 | 12/2008 |

* cited by examiner

*Primary Examiner* — Melissa Koval
*Assistant Examiner* — Stephen G Armstrong
(74) *Attorney, Agent, or Firm* — Simpson & Simpson, PLLC

(57) ABSTRACT

A measuring device for determining an operating state variable of a rotating structural element, in particular a bearing, which has a plurality of components. Specifically, the measuring device has a permanent magnet, an encoder ring for manipulating the magnetic field which is generated by the permanent magnet, a magnetic field sensor, a radio unit for transmitting measurement signals from the magnetic field sensor to an evaluation unit, and an energy converter unit for converting rotation energy into electrical energy. The encoder ring is produced from a ferromagnetic and non-premagnetized material.

15 Claims, 3 Drawing Sheets

MEASURING DEVICE FOR DETERMINING AN OPERATING STATE VARIABLE OF A ROTATING STRUCTURAL ELEMENT, IN PARTICULAR A BEARING

CROSS-REFERENCE TO RELATED APPLICATION

This application claims the priority of DE 10 2011 003 703.9 filed Feb. 7, 2011, which is incorporated by reference herein.

FIELD OF THE INVENTION

The invention relates to a measuring device for determining an operating state variable of a rotating structural element, in particular a bearing.

BACKGROUND OF THE INVENTION

Operating state variables which describe the rotation movement of the rotating structural element, such as rotary position, angular speed, angular acceleration etc., are of particular interest in the present case. Therefore, the invention relates primarily to a measuring device which detects at least one operating state variable which describes the rotation movement.

A measuring device for identifying rotation is disclosed in European Patent Specification EP 1 342 633 B1. The measuring device comprises a current generator, which has a stator and a rotor, a power supply circuit and a magnetic field sensor. In this case, the rotor, which is also called an encoder ring, encoder plate or incremental wheel in this context, has a large number of opposed magnet poles which alternate with one another in a direction over the circumference of the rotor, and a multipart ring element which is produced from a magnetic material is provided as the stator. The magnetic field sensor is arranged in a fixed position relative to the stator and is fixed either to said stator or to a support element for the stator. The magnetic field sensor, which is supplied with power by means of the generator and the power supply circuit, is used to register the alternating passage of the magnet poles of the rotor past the magnetic field sensor during rotation of the rotor, as a result of which the presence of a rotation movement is detected. The measuring device can be used, for example, as a component for an anti-lock brake system in the automotive sector. However, this considered to be disadvantageous since because the production costs are regarded as being excessively high.

SUMMARY OF THE INVENTION

Proceeding from the above, the invention is directed to specifying a further improved measuring device.

The measuring device, according to the present invention, serves to determine an operating state variable of a rotating structural element, in particular a bearing, and comprises a plurality of components. These components include a permanent magnet, an encoder ring for manipulating the magnetic field which is generated by the permanent magnet, a magnetic field sensor, a radio unit for transmitting measurement signals from the magnetic field sensor to an evaluation unit, and an energy converter unit for converting rotation energy into electrical energy. The encoder ring is produced from a ferromagnetic and non-premagnetized material as a result of which the associated production outlay and, therefore, the production costs are reduced relative to a design with pronounced and, in particular, alternating magnetization.

In one embodiment, the magnetic field sensor is fixed in position relative to the permanent magnet, whereas the encoder ring rotates together with the rotating structural element. In this way, magnetic biasing is defined in the region of the magnetic field sensor, a permanent magnetic field polarity being provided by the magnetic biasing independently of the operating state of the rotating structural element and therefore the rotary position of the encoder ring. Therefore, a movement of the encoder ring results in manipulation of the magnetic field, but not in reversal of the magnetic field polarity. This results, inter alia, in the operating point of the magnetic field sensor shifting, so that this can be chosen freely, and consequently expediently, by suitable selection of the configuration of the permanent magnet.

In another embodiment, at least one of the components of the measuring device, for example the radio unit and/or parts of the energy converter unit, which also include a power supply circuit and an intermediate energy storage means, are positioned in a housing or are injection-molded into a protective sheathing. Here, the housing or protective sheathing is designed in such a way that it moreover functions as a seal for the rotating structural element on account of a cover-like or cap-like shape. Therefore, both the component and the rotating structural element are protected, in particular against soiling, as a result of which both the structural element and the component are guaranteed a longer life expectancy. However, as an alternative, provision is also made of a cover-like seal with the component of the measuring device being fixed to the outside of the seal.

In accordance with a further refinement of the present invention, the magnetic field sensor is attached by means of a detachable connection, for example a screw connection, a plug connection or a clamping connection. This makes it possible for the magnetic field sensor, which typically has a shorter life expectancy than the other components of the measuring device, to be easily replaced.

The magnetic field sensor can also be a so-called active magnetic field sensor. The active magnetic field sensor is, for example, an XMR (X-magnetoresistive) sensor, a Hall sensor or an AMR (anisotropic magnetoresistive effect) sensor. Sensors of this kind are distinguished by a relatively simple structure and therefore favorable production costs.

Depending on the application the permanent magnet can also have an annular basic shape and/or exhibits multi-pole magnetization. Here, the multi-pole magnetization is preferably generated by an expedient arrangement of a plurality of dipoles or, at least in a first approximation, dipole moments. A suitable arrangement is, for example, one in which a number of dipoles or dipole moments are lined up with one another in the circumferential direction in such a way that their respective magnetic moment is arranged substantially parallel to the axial direction, with the moments of two adjacent dipoles or dipole moments being opposed to one another. In this case, the annular permanent magnet can, for example, be realized with a polarity which alternates in the circumferential direction by simply lining up suitably dimensioned cuboid bar magnets, so that a very simple structure is produced. However, as an alternative to this, the magnetic moments can be oriented substantially perpendicular to the axial direction instead of parallel. Since no movement relative to the magnetic field sensor is provided for the permanent magnets, a multi-pole permanent magnet of relatively simple construction and with a lower magnetization precision suffices to ensure comparable effectiveness of the measuring device compared to a structure according to European Patent Specification EP 1 342 633 B1 with a magnetized encoder ring.

In this context, a toroidal coil can be provided for the energy converter unit with the ring-like body of the toroidal coil substantially concentrically surrounding the annular permanent magnet. As a result, the set objective of specifying a structure which is as simple, compact and effective as possible is additionally taken into account.

In accordance with an alternative refinement, the permanent magnet used is a bar-like and, in particular, a single permanent magnet. Bar magnets of this kind can be produced with a particularly low level of outlay and are accordingly particularly advantageous in respect of cost.

In this context, a cylindrical coil can be provided for the energy converter unit. The cylindrical body of this cylindrical coil substantially coaxially surrounds the rod-like permanent magnet. In this way, the structure of the energy converter unit is suitably matched to the rod shape of the permanent magnet. The cylindrical coil and the permanent magnet are, in particular, accommodated in a common housing or injection-molded in a common protective sheathing in this case.

The refinements described are each considered to be independent inventive aspects which are independent of the design of the encoder ring from a ferromagnetic material.

BRIEF DESCRIPTION OF THE DRAWINGS

The invention will be explained in greater detail below with reference to a schematic drawing, in which.

DETAILED DESCRIPTION OF THE INVENTION

Mutually corresponding parts are provided with the same reference signs in all the figures.

Figure 1:
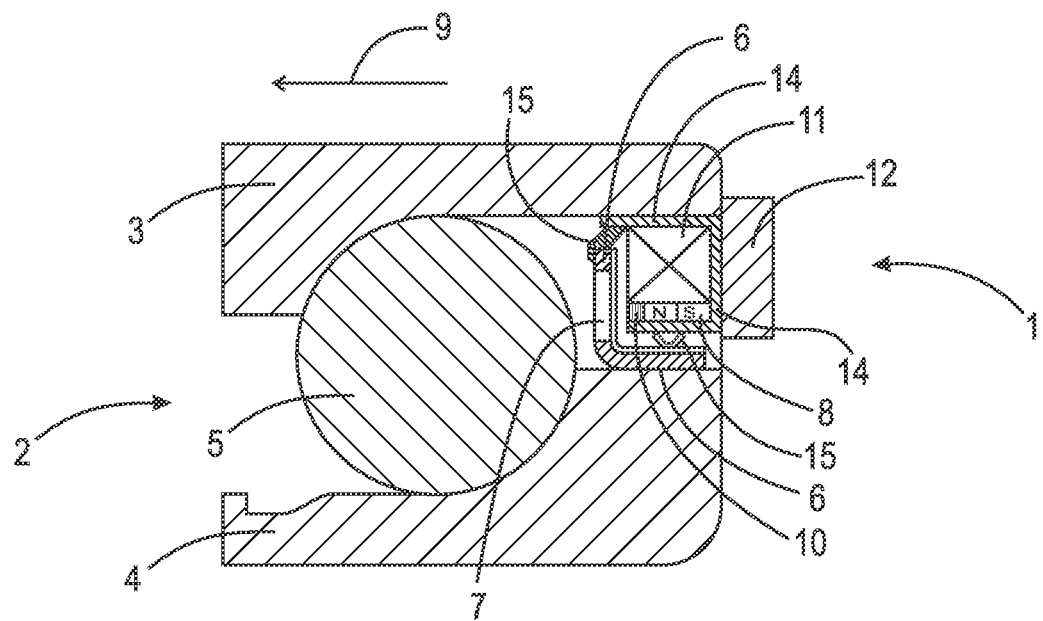
FIG. 1 shows a sectional illustration of a detail of a bearing having a measuring device attached to the bearing.

In the exemplary embodiment described below, the measuring device 1 serves to detect the rotation movement of a shaft which is attached to a frame with the aid of a rolling bearing 2. The rolling bearing 2, which is designed as a single-row angular contact ball bearing, is shown in the form of a sectional illustration of a detail in FIG. 1. This angular contact ball bearing is constructed substantially from an external ring 3, an internal ring 4 and a number of spherical rolling bodies 5. The external ring 3 is connected to the frame by a bearing housing. The frame defines an inactive reference system in the usual way of viewing, even if the frame executes relative movements in relation to the earth system during operation. In contrast, the internal ring 4 is firmly connected to the shaft and executes variable rotation movements relative to the inactive reference system together with said shaft. Accordingly, it suffices to determine the relative movement of the internal ring 4 to the external ring 3 by sensor in order to detect the rotation movement of the shaft. Therefore, the immediate surroundings of the rolling bearing 2, that is to say the bearing housing and the shaft, are not illustrated in the drawing either.

A ring-like body with an L-shaped profile is positioned between the external ring 3 and the internal ring 4 as the encoder ring 6. The ring-like body is firmly connected to the internal ring 4 and arranged concentrically in relation to same. As a result, the encoder ring 6, the internal ring 4 and the shaft always execute rotation movements together. The encoder ring 6, which is, for example, a shaped, stamped or sintered part, is produced from a ferromagnetic material and provided with a plurality of material cut-outs which are arranged in the separate limbs of the profile of the encoder ring 6 as approximately rectangular windows 7 and are distributed at regular intervals over the circumference of same. As an alternative to the design of the encoder ring 6 in the manner of a perforated plate with a rectangular configuration of the windows 7, further plate shapes are provided, for example oval plates or polygonal plates with n sides. Depending on the application, it is also expedient, in a departure from the above, to provide a disk-like body as the encoder ring 6. The disk-like body is either configured in the form of a gear wheel or has a corrugated plate shape at the edges.

Each encoder ring 6 serves to manipulate a multi-pole magnetic field, which is generated by a multi-pole permanent magnet 8. The multi-pole permanent magnet 8, which is likewise annular is fixed to the external ring 3, is positioned between the external ring 3 and the internal ring 4 and is arranged concentrically in relation to the external ring 3. The multi-pole magnetic field is formed by a large number of dipoles or dipole moments which are lined up with one another in the circumferential direction of the bearing. The magnetic moments of the dipoles are arranged substantially perpendicular to the circumferential direction of the bearing, that is to say in the axial direction 9, with adjacent moments being opposed to one another. A magnetic field sensor 10 is arranged on the end face of the permanent magnet 8 which faces the rolling bodies 5 and at which north and south poles continuously alternate in the circumferential direction of the bearing. The magnetic field sensor covers exactly one of the magnet poles with good approximation. On account of the positioning of the magnetic field sensor 10, the magnetic field share and therefore the magnetic field polarity of the adjacent dipole or dipole moment dominates in the region of the magnetic field sensor 10, as a result of which magnetic biasing is created for the magnetic field sensor 10. The encoder ring 6 manipulates the magnetic field on account of the magnetic biasing, depending on the rotary position, but not to such an extent that the polarity is reversed in the region of the magnetic field sensor 10.

The refinements of the encoder ring 6 and the permanent magnet 8 are matched to one another in a particular way. Given a corresponding rotary position of the encoder ring 6 relative to the permanent magnet 8, the expansion of a window 7 in the circumferential direction of the bearing corresponds exactly to the expansion of a magnet pole in precisely this direction. At the same time, the corresponding distances between two adjacent windows 7 have these magnitudes too. As a result, given the corresponding rotary position, all the poles of one type are each placed behind a window 7 as viewed in the direction opposite the axial direction 10, whereas the opposing poles are covered by the ferromagnetic material of the encoder ring 6. In those magnet poles in which ferromagnetic material is positioned at the end face, the magnetic field lines are deflected out of the stray field in such a way that said magnetic field lines are routed to the opposing pole in the manner of an arc in the near field of the dipole or dipole moment, as a result of which the magnetic field is intensified in the corresponding near field. When the encoder ring 6 rotates, the poles of one type and then the opposing poles alternately dominate in the near field of the permanent magnet 8 as a result. Finally, a corresponding rotary movement leads alternately to intensification and weakening of the magnetic field in the region of the magnetic field sensor 10, as a result of which the movement of the encoder ring 6 and, therefore, finally the rotation of the shaft are detected by sensor technology.

The magnetic field sensor 10 provided is preferably a so-called active magnetic field sensor. Active magnetic field sensors, for example a Hall sensor, require electrical energy in order to operate. To this end, the measuring device 1 comprises an energy converter unit for converting rotation energy into electrical energy. This energy converter unit is realized with the aid of a toroidal coil 11 which is arranged concentrically in relation to the permanent magnet 8 and to the encoder ring 6. The alternating magnetic field which is created in the event of rotation of the encoder ring 6 induces an alternating current in the toroidal coil 11, and this alternating current is used to supply power to the magnetic field sensor 10. In order to ensure power is supplied in accordance with requirements independently of the operating state and, therefore, the movement state, an energy supply circuit and an intermediate energy storage means are preferably additionally provided for the energy converter unit. These components, together with a radio unit, are accommodated in a housing 12 which is attached to the external ring 3 of the rolling bearing 2.

Figure 4:
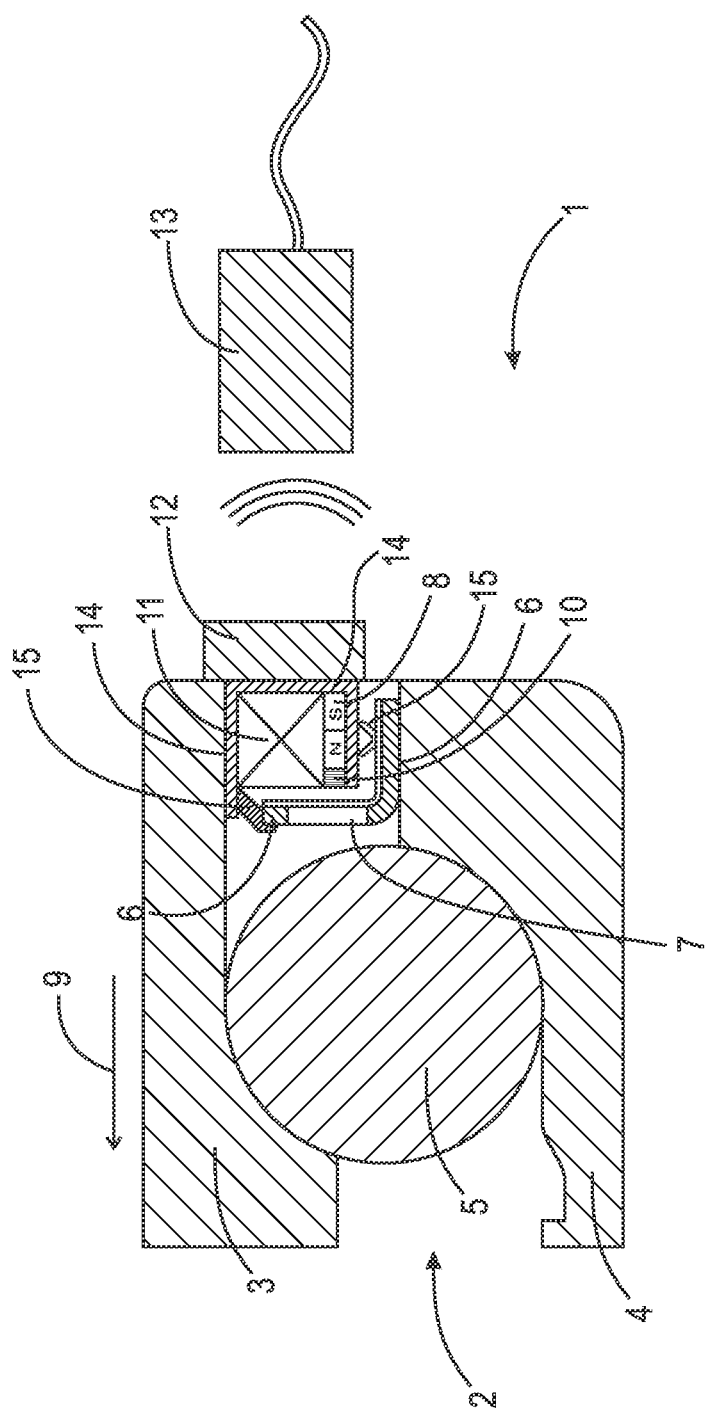
FIG. 4 shows a sectional illustration of the detail of the bearing having the measuring device attached to it according to FIG. 1, and also a receiving unit.

The radio unit is used to transmit the sensor data from the magnetic field sensor 10 to a receiving unit 13 which is shown in FIG. 4 and, for its part, is connected to an evaluation unit (not illustrated) such that it can transmit signals. Therefore, the measuring device 1 is also suitable for monitoring rotating structural elements which, on account of their design and/or positioning, are difficult to access and are not suitable for data transmission via cable.

Figure 2:
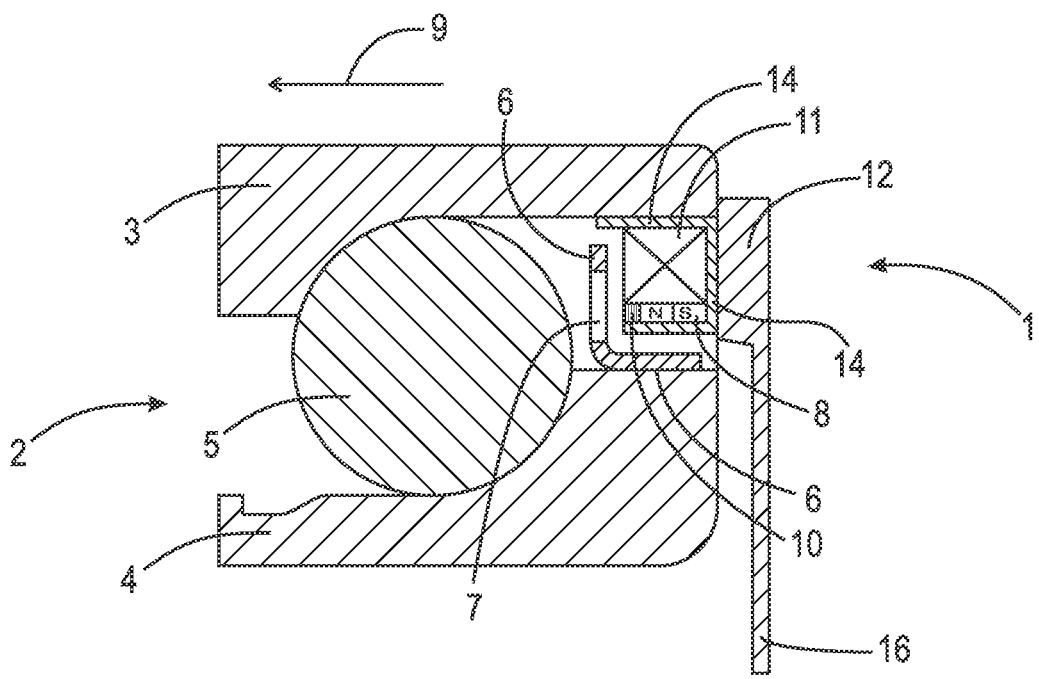
FIG. 2 shows a sectional illustration of the detail of the bearing having an alternative measuring device attached to the bearing.

The positioning and fixing aids provided in the exemplary embodiment are additional holding elements 14 which have an angled profile and with which the toroidal coil 11, the permanent magnet 8 and the magnetic field sensor 10 are held on the external ring 3. These components of the measuring device 1, which are positioned outside the housing 12, are also protected against soiling with the aid of sealing elements 15 which are composed, for example, of an elastomer. In this case, the sealing elements 15 are preferably injection-molded onto the encoder ring 6 and/or to the holding elements 14 in the form of a sealing lip. As an alternative, this protection can also be ensured by a cover 16 which flanks the rolling bearing 2 or a corresponding cap. A corresponding embodiment variant is illustrated in FIG. 2. In this case, the cover 16 simultaneously serves as a housing 12 for the energy converter circuit, the intermediate energy storage means and the radio unit. A material reinforcement at the end face is further provided for the cover 16 with the same space requirement, and the components being positioned in this material reinforcement.

Figure 3:
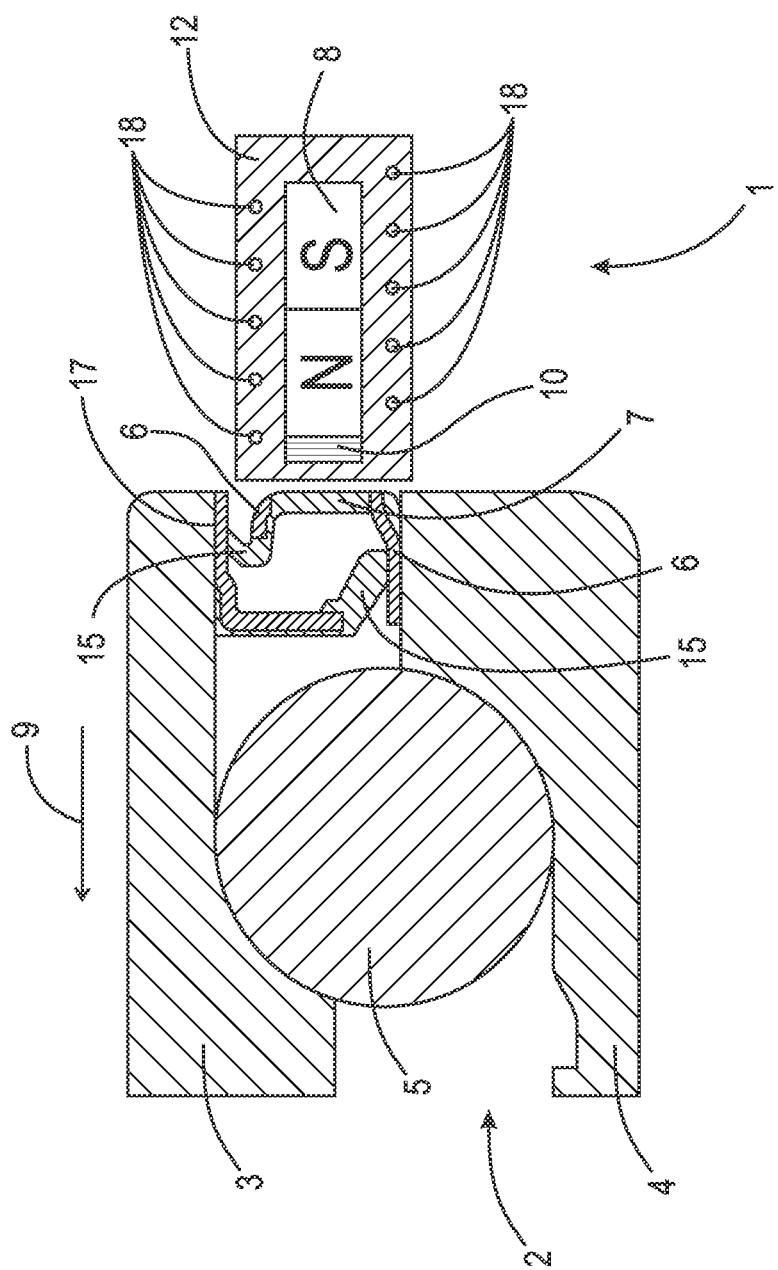
FIG. 3 shows a sectional illustration of the detail of an alternative bearing having a further alternative measuring device positioned next to the bearing.

A further embodiment variant of the measuring device 1 is shown in FIG. 3. The encoder ring 6 is once again arranged between the external ring 3 and the internal ring 4 and firmly connected to the internal ring 4. The profile of the encoder ring 6 has a basic shape in the form of a U in the present case. The base of the profile is arranged perpendicular to the axial direction 9. Windows 7 are again made in the base. The windows also are substantially rectangular in this exemplary embodiment too. The encoder ring 6, together with an auxiliary plate 17 and sealing elements 15, additionally acts as a two-stage protective barrier for the rolling bodies 5. This protective barrier is supplemented with a seal (not illustrated) on the opposite flank of the rolling bearing 2.

The permanent magnet 8 provided in this embodiment version is a bar magnet which is positioned outside the rolling bearing 2 and of which the dipole axis lies parallel to the axial direction 9 with good approximation, so that one of its end faces is oriented substantially parallel to the profile base of the encoder ring 6. The magnetic field sensor 10 is positioned on this end face too. On account of the window 7 made in the profile base, the near field of the permanent magnet is manipulated in an analogous manner to the abovementioned exemplary embodiment in the event of movement of the internal ring 4 and, therefore, of the encoder ring 6, and, therefore, a movement of the encoder ring 6 relative to the magnetic field sensor 10 is detected by sensor technology.

So as to match the bar shape of the permanent magnet 8, the coil of the energy converter unit is cylindrical in this embodiment variant of the measuring device 1, and the cylindrical coil 18 substantially coaxially surrounds the bar magnet. The cylindrical coil 18, the permanent magnet 8, the magnetic field sensor 10, the energy supply circuit, the intermediate energy storage means and the radio unit are accommodated in a common housing 12 in this case.

An energy converter unit with an energy supply circuit and an intermediate energy storage means is provided in the two embodiment variants cited here. This energy converter unit supplies power both to the magnetic field sensor 10 and to the radio unit for transmitting the sensor data. The intermediate energy storage means is, for example, provided by a capacitor or a rechargeable battery system and ensures the loads are supplied with power even if the rotating structural element stops. If, in contrast, the structural element executes a rotating movement, the electrical energy generated is also used to charge the energy reservoir in the intermediate energy storage means. Furthermore, measuring device variants are provided in which additional magnetic field sensors or supplementary sensors, for example for detecting temperature, expansion or vibration, are used. These sensors are then likewise supplied with power with the aid of the energy converter unit.

LIST OF REFERENCE SYMBOLS

1 Measuring Device
2 Rolling Bearing
3 External Ring
4 Internal Ring
5 Rolling Body
6 Encoder Ring
7 Window
8 Permanent Magnet
9 Axial Direction
10 Magnetic Field Sensor
11 Toroidal Coil
12 Housing
13 Receiving Unit
14 Holding Element
15 Sealing Element
16 Cover
17 Auxiliary Plate
18 Cylindrical Coil

What is claimed:

1. A bearing, comprising:
an external ring;
an internal ring;
at least one rolling body located between the external and internal rings in a radial direction orthogonal to an axial direction; and,
a measuring device for determining an operating state variable of the bearing, the measuring device including:

a permanent magnet;
an encoder ring for manipulating a magnetic field which is generated by the permanent magnet;
a magnetic field sensor;
a radio unit for transmitting measurement signals from the magnetic field sensor to an evaluation unit; and
an energy converter unit for converting rotation energy into electrical energy, wherein:
an entirety of the magnetic field sensor is located between the encoder ring and the permanent magnet in the axial direction;
the encoder ring is produced from a ferromagnetic and non-premagnetized material; and
an entirety of the sensor is located between the external and internal rings in the radial direction.

2. The measuring device according to claim 1, wherein the magnetic field sensor is in a fixed position relative to the permanent magnet so as to provide magnetic biasing for defining magnetic field polarity in a region of the magnetic field sensor independently of an operating state of the bearing.

3. The measuring device according to claim 1, further comprising a housing configured as a cover or a cap that forms a seal for the bearing where at least one component of the measuring device is positioned in the housing.

4. The measuring device according to claim 1, wherein the magnetic field sensor is detachable.

5. The measuring device according to claim 1, wherein the magnetic field sensor is an active magnetic field sensor.

6. The measuring device according to claim 1, wherein the permanent magnet is an annular permanent magnet.

7. The measuring device according to claim 6, wherein the annular permanent magnet exhibits multi-pole magnetization.

8. The measuring device according to claim 6, wherein the energy converter unit comprises a toroidal coil having a ring-shaped body that substantially concentrically surrounds the annular permanent magnet.

9. The measuring device according to claim 1, wherein the permanent magnet is a bar-shaped permanent magnet.

10. The measuring device according to claim 9, wherein the energy converter unit comprises a cylindrical coil having a cylindrical body that substantially coaxially surrounds the bar-shaped permanent magnet.

11. The bearing of claim 1, wherein respective entireties of the magnetic field sensor and the permanent magnet are aligned in the axial direction.

12. A bearing, comprising:
an external ring;
an internal ring;
at least one rolling body located between the external and internal rings in a radial direction orthogonal to an axial direction; and,
a measuring device for determining an operating state variable of a rotating structural element, the measuring device including:
a permanent magnet;
an encoder ring for manipulating a magnetic field which is generated by the permanent magnet;
a magnetic field sensor;
a radio unit for transmitting measurement signals from the magnetic field sensor to an evaluation unit; and
an energy converter unit for converting rotation energy into electrical energy, wherein:
an entirety of the magnetic field sensor is located between the encoder ring and the permanent magnet in the axial direction;
the encoder ring is produced from a ferromagnetic and non-premagnetized material; and
an entirety of the encoder is located between the external and internal rings in the radial direction.

13. A bearing, comprising:
an external ring;
an internal ring;
at least one rolling body located between the external and internal rings; and,
a measuring device for determining an operating state variable of a rotating structural element, the measuring device including:
a permanent magnet;
an encoder ring for manipulating a magnetic field which is generated by the permanent magnet and including at least one window located between the at least one rolling body and the permanent magnet in an axial direction;
a magnetic field sensor;
a radio unit for transmitting measurement signals from the magnetic field sensor to an evaluation unit; and
an energy converter unit for converting rotation energy into electrical energy, wherein the encoder ring is produced from a ferromagnetic and non-premagnetized material.

14. The bearing of claim 13, wherein the at least one window is located between the at least one rolling element and the magnetic field sensor in the axial direction.

15. The bearing of claim 13, wherein the at least one window, the magnetic field sensor, and the permanent magnet are aligned in the axial direction.

* * * * *